(12) United States Patent
Nagara et al.

(10) Patent No.: US 12,235,953 B2
(45) Date of Patent: Feb. 25, 2025

(54) ATTACK ANALYZER, ATTACK ANALYSIS METHOD AND ATTACK ANALYSIS PROGRAM

(71) Applicant: DENSO CORPORATION, Kariya (JP)

(72) Inventors: Keigo Nagara, Kariya (JP); Taiji Abe, Kariya (JP); Reiichiro Imoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 431 days.

(21) Appl. No.: 17/693,469

(22) Filed: Mar. 14, 2022

(65) Prior Publication Data

US 2022/0309153 A1  Sep. 29, 2022

(30) Foreign Application Priority Data

Mar. 29, 2021 (JP) ................................. 2021-056122

(51) Int. Cl.
*G06F 21/55* (2013.01)
(52) U.S. Cl.
CPC ...... *G06F 21/552* (2013.01); *G06F 2221/034* (2013.01)
(58) Field of Classification Search
CPC .......................... G06F 21/552; G06F 2221/034
See application file for complete search history.

(56) References Cited

U.S. PATENT DOCUMENTS

| 12,034,757 | B2 * | 7/2024 | Nagatani | ............. | H04L 63/1433 |
| 2020/0210894 | A1 * | 7/2020 | Mimura | .................. | G06N 5/02 |
| 2021/0273966 | A1 * | 9/2021 | Sasaki | ............... | H04L 12/40176 |
| 2021/0344700 | A1 * | 11/2021 | Ueno | ....................... | H04L 67/12 |
| 2023/0262080 | A1 * | 8/2023 | Ishii | ..................... | H04L 63/1416 709/224 |
| 2023/0269258 | A1 * | 8/2023 | Ushio | ..................... | H04L 67/12 726/22 |
| 2023/0275877 | A1 * | 8/2023 | Harel | ................. | G01C 21/3822 713/189 |
| 2023/0283617 | A1 * | 9/2023 | Tasaki | ................ | G05B 23/0275 726/22 |
| 2023/0283622 | A1 * | 9/2023 | Vu | .......................... | H04L 67/12 726/1 |
| 2023/0327956 | A1 * | 10/2023 | Matsubayashi | ....... | H04L 41/145 370/254 |
| 2023/0344847 | A1 * | 10/2023 | Hamada | .............. | H04L 63/1425 |

(Continued)

FOREIGN PATENT DOCUMENTS

| JP | 2008009850 A | 1/2008 |
| JP | 2014-041506 A | 3/2014 |

(Continued)

*Primary Examiner* — Stephen T Gundry
(74) *Attorney, Agent, or Firm* — Harness, Dickey & Pierce, P.L.C.

(57) ABSTRACT

An attack analyzer includes: a common log acquisition unit acquiring a common security log including abnormality information indicating abnormality detected by an electronic control system, and a common abnormality position indicating an abnormality position of the abnormality converted to be common among the electronic control system and other electronic control systems; an attack/abnormality relationship table storage unit storing an attack/abnormality relationship table; an estimation unit; and an output unit outputting attack information including the attack type.

18 Claims, 9 Drawing Sheets

(56) References Cited

U.S. PATENT DOCUMENTS

| | | | | |
|---|---|---|---|---|
| 2023/0344859 A1* | 10/2023 | Matsui | | H04L 63/1441 |
| 2023/0350714 A1* | 11/2023 | Sekiya | | G08G 1/00 |
| 2023/0362181 A1* | 11/2023 | Hiruta | | H04L 63/1425 |
| 2023/0370480 A1* | 11/2023 | Maeda | | H04L 63/1425 |
| 2023/0379344 A1* | 11/2023 | Chiba | | H04L 63/1425 |
| 2023/0409704 A1* | 12/2023 | Kim | | G06F 21/554 |
| 2024/0015047 A1* | 1/2024 | Okano | | G06F 11/277 |
| 2024/0045970 A1* | 2/2024 | Morita | | G06F 21/554 |
| 2024/0104204 A1* | 3/2024 | Borrits | | G06F 21/55 |
| 2024/0140448 A1* | 5/2024 | Kasuya | | B60W 50/023 |
| 2024/0214351 A1* | 6/2024 | Park | | H04L 41/06 |

FOREIGN PATENT DOCUMENTS

| | | |
|---|---|---|
| JP | 2016-143320 A | 8/2016 |
| JP | 2020-123307 A | 8/2020 |
| JP | 2020119090 A | 8/2020 |

* cited by examiner

| INDIVIDUAL POSITION | | COMMON POSITION | |
|---|---|---|---|
| ECU NAME | IDENTIFICATION NUMBER | LAYER NUMBER | IDENTIFICATION NUMBER |
| ECU-A | 0x0001 | FIRST LAYER | 0x01 |
| ECU-B | 0x0002 | FIRST LAYER | 0x01 |
| ECU-C | 0x0003 | SECOND LAYER | 0x02 |
| ECU-D | 0x0004 | THIRD LAYER | 0x03 |
| ECU-E | 0x0005 | THIRD LAYER | 0x03 |

FIG. 7

| ATTACK TYPE | ATTACK START POSITION | ATTACK TARGET POSITION | ABNORMALITY CONTENTS ||||||||||
|---|---|---|---|---|---|---|---|---|---|---|---|---|
| | | | FIRST LAYER ||| SECOND LAYER ||| THIRD LAYER |||
| | | | ABNOR-MALITY A | ABNOR-MALITY B | ABNOR-MALITY C | ABNOR-MALITY D | ABNOR-MALITY A | ABNOR-MALITY B | ABNOR-MALITY C | ABNOR-MALITY D | ABNOR-MALITY A | ABNOR-MALITY B | ABNOR-MALITY C |
| ATTACK A | 0000 | 0x01 | ○ | — | ○ | ○ | — | — | — | — | — | — | — |
| ATTACK B | 0x01 | 0x02 | — | — | — | — | ○ | — | ○ | ○ | — | — | — |
| ATTACK C | 0x02 | 0x02 | — | — | — | — | — | ○ | ○ | ○ | — | — | — |
| ATTACK D | 0x01 | 0x02 | — | — | — | — | ○ | ○ | ○ | — | — | — | — |
| ... | | | | | | | | | | | | | |
| ATTACK X | 0x02 | 0x03 | — | — | — | — | — | — | — | — | — | ○ | ○ |

ATTACK ANALYZER, ATTACK ANALYSIS METHOD AND ATTACK ANALYSIS PROGRAM

CROSS REFERENCE TO RELATED APPLICATION

The present application is based on and claims the benefit of priority of Japanese Patent Application No. 2021-056122, filed on Mar. 29, 2021, the disclosure of which is incorporated herein by reference.

TECHNICAL FIELD

The present disclosure generally relates to a device that analyzes an attack on an electronic control system mounted on a movable body such as an automobile, including an attack analyzer, an attack analysis method, and an attack analysis program.

BACKGROUND INFORMATION

In recent years, technologies for driving support and automated driving control, including V2X such as vehicle-to-vehicle communication and road-to-vehicle communication, have been attracting attention. As a result, a vehicle has a communication function, and so-called connectivity of the vehicle has been promoted. As a result, vehicles are more likely to be subject to cyber attacks such as unauthorized access. Therefore, it is necessary to analyze cyber attacks on vehicles and formulate countermeasures.

There are various methods for detecting abnormality occurring in a vehicle and analyzing cyber attacks based on the detected abnormality. A comparative example discloses that, while detected abnormality data is collected, by collating a combination of the items in which the abnormality is detected with an abnormality detection pattern specified in advance for each attack, a type of attack corresponding to the abnormality is identifiable.

SUMMARY

It is an object of the present disclosure to realize an attack analyzer or the like capable of analyzing a cyber attack regardless/irrespective of the configuration of an electronic control system mounted on a vehicle.

BRIEF DESCRIPTION OF THE DRAWINGS

Objects, features, and advantages of the present disclosure will become more apparent from the following detailed description made with reference to the accompanying drawings, in which:

FIG. 7 is a diagram illustrating an attack/abnormality relationship table of the first and second embodiments;

DETAILED DESCRIPTION

Embodiments of the present disclosure will be described below with reference to the drawings. The present disclosure is not limited to the following embodiments.

In the present disclosure, it should be noted that the present disclosure is not limited to the following embodiments. Further, at least the words and phrases in quotation marks may mean the words and phrases described in the section of claims or in the section above, and are not limited to the following embodiments.

The configurations and methods described in the dependent claims of the claims section are illustrative configurations and methods in the disclosure described in the independent terms of the claims. The configurations and methods of the embodiments corresponding to the configurations and methods described in the dependent claims, and the configurations and methods described only in the embodiments that are not described in the claims are illustrative configurations and methods in the present disclosure. The configuration and method described in the embodiment when the description of the claims is wider than the description of the embodiment is also an illustrative configuration and method in the present disclosure in the sense that it is an example of the configuration and method of the present disclosure. In either case, the description in the independent claims provides an essential configuration and method of the present disclosure.

Any effects described in the embodiments are effects obtained by a configuration of an embodiment as an example of the present disclosure, and are not necessarily effects of the present disclosure.

When there are multiple embodiments, a configuration disclosed in each embodiment is not limited to each embodiment, but can be combined across embodiments. For example, a configuration disclosed in one embodiment may be combined with other embodiments. Configurations disclosed in multiple embodiments may be collected and combined.

A difficulty described above is not a publicly known matter but is originally found by an applicant of the present application, and is a fact that confirms/proves non-obvious-

1. (First Embodiment)

Figure 1:
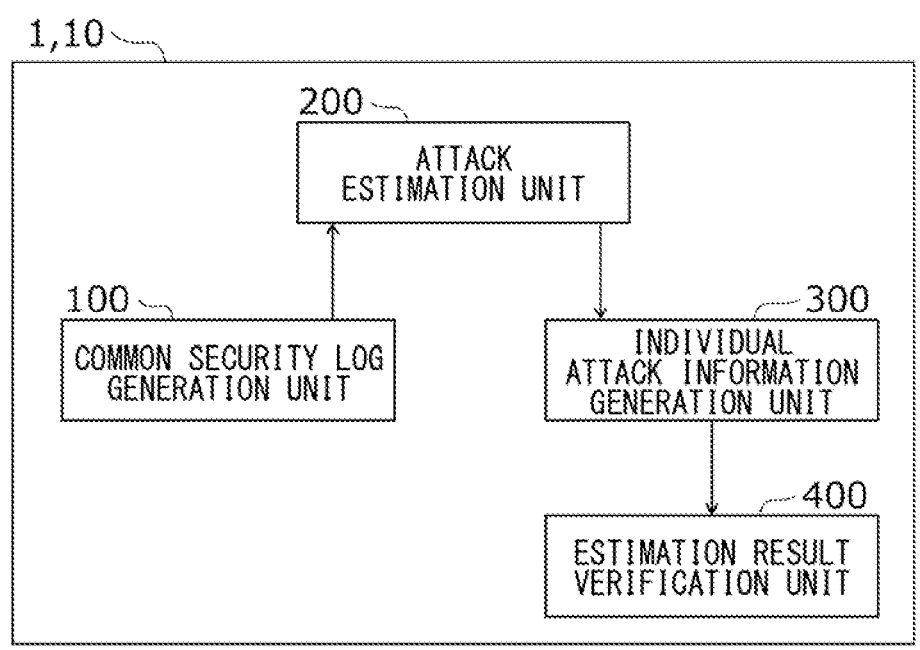
FIG. 1 is a block diagram showing a configuration example of an attack analysis system of a first embodiment.

An attack analyzer 10 of the present embodiment will be described with reference to FIG. 1. The attack analyzer 10 is a device that analyzes a cyber attack on an electronic control system S, which will be described later. The attack analyzer 10 includes a common security log generation unit 100, an attack estimation unit 200, an individual attack information generation unit 300, and an estimation result verification unit 400. In the following embodiments, a system having the attack analyzer 10 is referred to as an attack analysis system. Therefore, FIG. 1 is also a diagram showing an attack analysis system 1 of the present embodiment.

In each of the embodiments described below, the electronic control system S that receives a cyber attack will be described as an example which is embodied as an in-vehicle system mounted on a vehicle. However, the electronic control system S is not limited to the in-vehicle system, and can be applied to any electronic control system including a plurality of ECUs. For example, the electronic control system S may be an electronic control system "mounted" on an arbitrary "movable body", or may be mounted on a stationary body instead of a movable body.

The "movable object" refers to an object which is movable, and a travel speed thereof is arbitrary. Naturally, the above also includes a case where the movable object is stopped. Examples of the mobile object include, but are not limited to, automobiles, motorcycles, bicycles, pedestrians, ships, aircrafts, and objects mounted thereon. Further, "mounted" includes not only a case where it is directly fixed to the movable body but also the case where it is not fixed to the movable body but moves together with the movable body. For example, the above may be a case where a person riding on the movable body carries the object, or a case where the object is mounted in a load placed on the movable body.

Figure 2A:
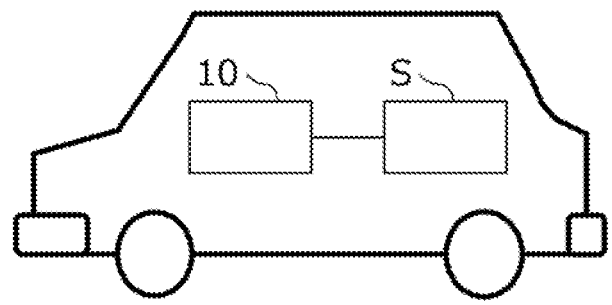
FIGS. 2A and 2B are respectively an explanatory diagram illustrating an attack analyzer according to the first embodiment.
Figure 2B:
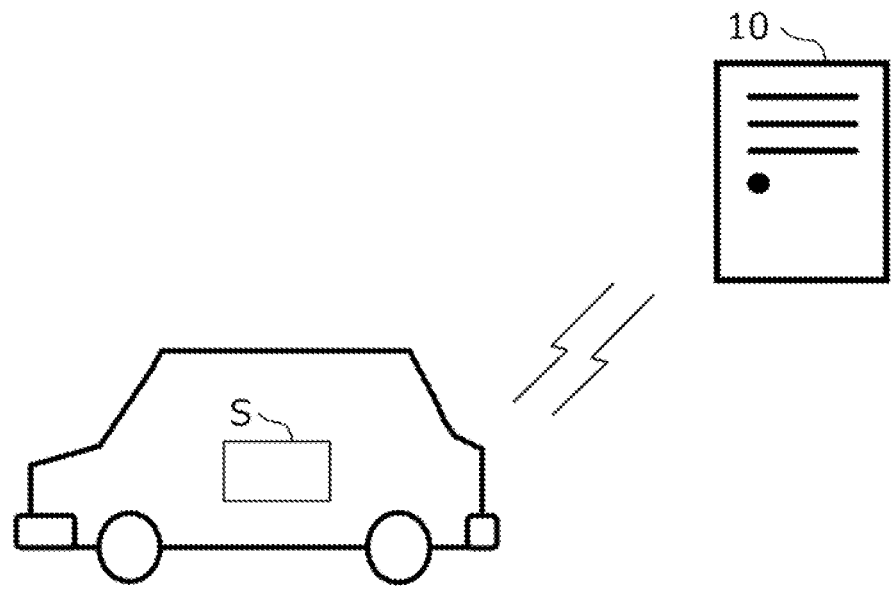

FIGS. 2A, 2B are respectively a diagram illustrating the attack analyzer 10 of the present embodiment. In the present embodiment, as shown in FIG. 2A, the attack analyzer 10 is mounted on a vehicle equipped with the electronic control system S. and as shown in FIG. 2B, the attack analyzer 10 is arranged outside the vehicle, in assumption.

As shown in FIG. 2A, when the vehicle is equipped with the electronic control system S and the attack analyzer 10, the attack analyzer 10 can analyze the cyber attack without delay when the electronic control system S receives a cyber attack, and thus, it is possible to respond quickly to the cyber attack.

On the other hand, as shown in FIG. 2B, when the attack analyzer 10 is a server device, when an abnormality occurs in the electronic control system S mounted on the vehicle, the server device receives, from the vehicle, an individual security log detected and generated by a security sensor described later via a wireless communication network. Therefore, compared to the case where the attack analyzer 10 is mounted on the vehicle, it takes time to analyze the cyber attack and feed the analysis result back to the vehicle, but it is possible to reduce a processing load on the vehicle side.

(1) About Electronic Control System S

The electronic control system S will be described with reference to FIG. 3 The electronic control system S is composed of a plurality of electronic control devices (hereinafter referred to as ECUs). In the example shown in FIG. 3, the electronic control system S is composed of ECUs A to E, and each ECU is connected via an in-vehicle network.

The ECU constituting the electronic control system S is equipped with a security sensor that monitors the inside of the ECU and the network to which the ECU is connected. When the security sensor detects an abnormality that has occurred inside the ECU or in the network, it generates a security log and outputs it to the common security log generation unit 100, which will be described later. Hereinafter, the security log generated and output by the security sensor will be referred to as an individual security log. The individual security log includes abnormality information indicating an abnormality detected by the security sensor and an abnormality position indicating a position where the abnormality detected by the security sensor has occurred. The individual security log may also include identification information for identifying the electronic control system S, identification information for the security sensor that detected the abnormality, identification information for the ECU equipped with the security sensor, time when the abnormality was detected, number of times the abnormality was detected, and order of detecting the abnormality, information regarding the content of data received before the detection of the abnormality as well as the IP address (i.e., source and destination of such data transmission), and the like.

(2) Configuration of Common Security Log Generation Unit 100

Figure 4:
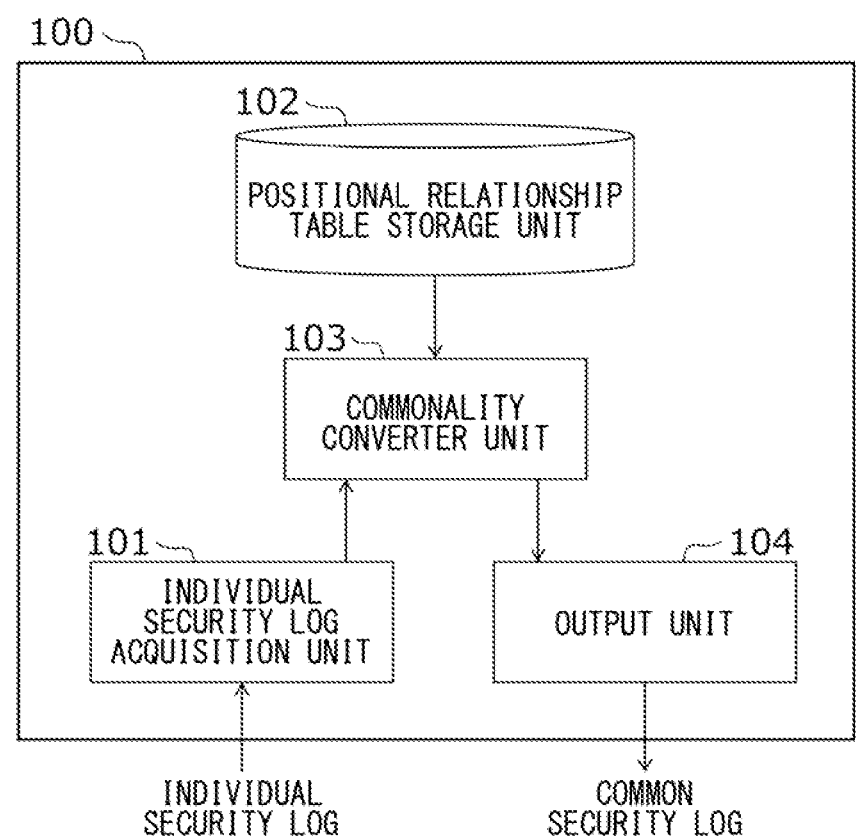
FIG. 4 is a block diagram showing a configuration example of a common security log generation unit of the first and second embodiments.

The common security log generation unit 100 will be described with reference to FIG. 4. The common security log generation unit 100 includes an individual log acquisition unit 101, a positional relationship table storage unit 102, a commonality converter unit 103, and an output unit 104.

The individual log acquisition unit 101 acquires an individual security log including abnormality information indicating an abnormality detected by the electronic control system S and an abnormality "position" where the abnormality has occurred.

Here, the "position" includes, for example, individual electronic control devices and networks.

Figures 5, 6:
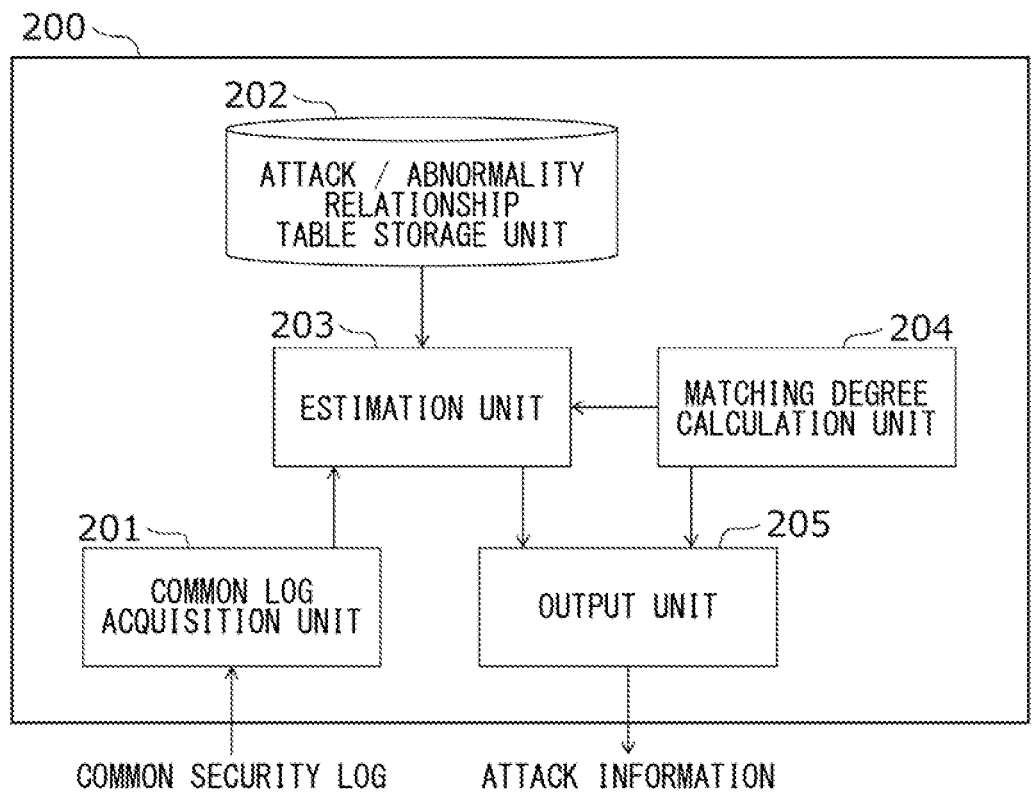
FIG. 5 is a diagram illustrating a positional relationship table of the first and second embodiments.
FIG. 6 is a block diagram showing a configuration example of an attack estimation unit according to the first and second embodiments.

The positional relationship table storage unit 102 is a storage unit storing a positional relationship table, which shows the relationship between (a) an individual position, which is a position in the electronic control system S, and (b) a common position, which is a position where the individual position is made common between/among the electronic control system S and other electronic control systems. It can also be understood that the individual position is a position in which the common position is individualized to the position in the electronic control system S. FIG. 5 is a diagram showing an example of a positional relationship table. In the positional relationship table shown in FIG. 5, each ECU of the electronic control system S shown in FIG. 3 and a common position of each ECU are stored in association with each other.

The association between the individual position and the common position is established based on, for example, a security protection layer of the electronic control system, that is, based on a "security level". Many electronic control systems employ multi-layer protection to increase security against attacks. Multi-layer protection provides security functions in a hierarchical and multi-layered manner as a countermeasure against attacks, so that even if one countermeasure (that is, the first layer) is breached in the event of an attack, the next countermeasure (that is, the second layer) can provide protection against the attack, which is known as a method for enhancing the protection power of the electronic control system. Therefore, in an electronic control system that employs multi-layer protection, there are a plurality of layers having different security levels. Therefore, the electronic control system S is divided into multiple layers according to the security level, and, the individual position, which is a position unique to the electronic control system S, is associated with the common position, depending on to which of the multiple layers the individual position belongs. That is, in the example described above, the common position corresponds to the position of the protection layer in the electronic control system S.

Here, the "security level" is an index indicating safety against an attack or a deterrent against an attack.

Figure 3:
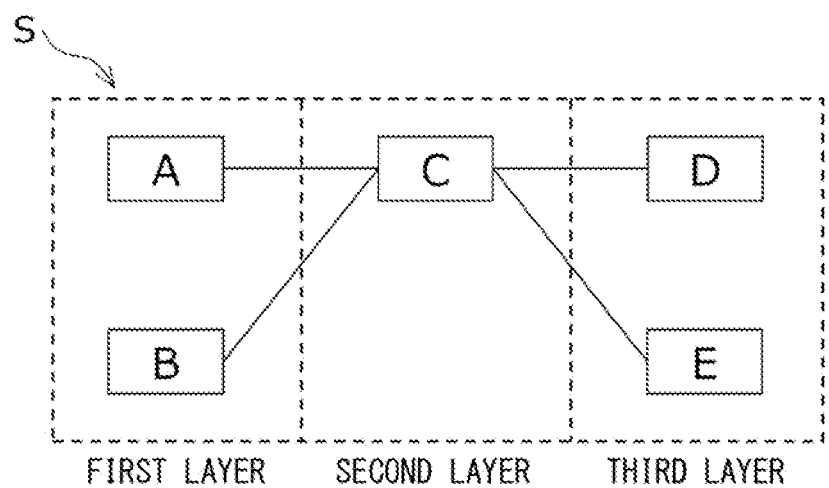
FIG. 3 is a diagram illustrating an electronic control system that has been attacked by an analysis target by the attack analyzer of the first and second embodiments.

The electronic control system S shown in FIG. 3 has three layers of protection. In the example described above, ECU-A and ECU-B belong to the first layer, ECU-C belongs to the second layer, and ECU-D and ECU-E belong to the third layer. For example, ECU-A and ECU-B are communication ECUs respectively having a communication function with the outside, and these ECUs are equipped with a security function for monitoring data entering the inside of the vehicle from the outside of the vehicle. In the example described above, an area monitored by the ECU having such a security function is the first layer. On the other hand, the ECU-C is, for example, a gateway ECU equipped with a security function for monitoring data communicated between (a) a network reaching to an ECU that is connected to the outside of the vehicle and (b) a network reaching to an ECU that performs vehicle control. The ECU-C takes security measures different from those of the above-mentioned ECU-A and ECU-B, and it can be understood that the area monitored by the ECU-C has a different security level than the one for an area protected by the ECU-A and the ECU-B, i.e., than the security level of the first layer. Therefore, in the example described above, the area monitored by the ECU-C is set as the second layer. The ECU-D and ECU-E are, for example, vehicle control ECUs that control the movement/behavior of the vehicle. It can also be understood that the ECU-D and the ECU-E monitor/cover an area in which only the data that has passed through the security function of the ECU-C is communicated and has a security level different from that of the second layer. Therefore, these ECUs belong to a layer different from that of the ECU-C, i.e., belong to the third layer. Then, in the positional relationship table shown in FIG. 5, the name and identification number of each ECU shown in FIG. 3 and the layer number and its identification number shown in FIG. 3 are stored in association with each other.

Note that the protection layer of the electronic control system S shown in FIG. 3 and the present embodiment, and the security functions constituting the protection layer are merely an example, and the present disclosure is not limited thereto. For example, the electronic control system S may have four or more protection layers. Further, even when two or more ECUs have the same security function, different protection layers may be provided by monitoring different data.

Even if the physical configuration of the electronic control systems may differ depending on the vehicle types or the like, multiple security functions are commonly arranged/provided in the electronic control systems that employ multi-layer protection. Therefore, in the electronic control system having any configuration, the electronic control system can be divided into multiple layers according to the protection layer by the security function, that is, the security level. Therefore, by abstracting a position unique to a configuration of an electronic control system as a position belonging to the protection layer, the position (that is, the individual position) in the electronic control system S can be processed/treated as a common position among the electronic control system S and other electronic control systems.

Not that, in the example shown in FIG. 3, an example in which the electronic control system is divided into multiple layers according only to the security level is described. However, association between the individual position and the common position may be established by using other parameters in addition to the security level. For example, the individual position and the common position may be associated with each other according to a network connected to the ECU. For example, even certain ECUs belonging to the same security level may be associated with different common positions depending on whether a network connected to the certain ECUs is CAN or Ethernet.

As another example, the individual position and the common position may be associated with each other based on the function of the ECU. For example, ECU-D and ECU-E in FIG. 3 are ECUs belonging to the same security level. However, in case where the ECU-D is an ECU that controls an engine and high safety is required and the ECU-E is an ECU that controls air conditioning and high safety is not required, the ECU-D and ECU-E are associated with respectively different common positions.

Note that when the ECU has virtual machines, the virtual machines on the same ECU may be associated with different common positions. For example, on one ECU, a virtual machine A has a function as an entry point to an ECU for vehicle control and also has a security function, and another virtual machine B has a vehicle control function, the virtual machine A comes to belong to the first layer, and the virtual machine B comes to belong to the second layer, which is a layer having a different security level from the virtual machine A.

The commonality converter unit 103 uses the positional relationship table stored in the positional relationship table storage unit 102 to convert the abnormality position included in the individual security log acquired by the individual log acquisition unit 101 to a common abnormality position, which is a common position among with the electronic control system S and other electronic devices. Specifically, the commonality converter unit 103 identifies the individual position of the positional relationship table corresponding to the abnormality position of the individual security log, and then identifies the common position associated with the individual position. The identified common position is a common abnormality position.

Note that, as shown in FIG. 2B, when the attack analyzer 10 is a server device, the common security log generation unit 100 acquires individual security logs from a large number of vehicles and generates a common security log. Therefore, the positional relationship table storage unit 102 needs to store a large number of positional relationship tables corresponding to the electronic control systems of each of those vehicles. Therefore, in order to easily identify the positional relationship table used by the commonality converter unit 103, when the attack analyzer 10 is a server device, the individual security log may desirably include identification information that identifies the electronic control system. In such manner, the commonality converter unit 103 can easily identify the positional relationship table used for converting the abnormality position included in the individual security log.

The output unit 104 outputs a common security log including the abnormality information and the common abnormality position converted by the commonality converter unit 103 to the attack estimation unit 200, which will be described later. In addition to the abnormality information and the common abnormality position, the common security log may further include information included in the individual security log, for example, the abnormality position before being converted by the commonality converter unit 103, and information about the security sensor.

(3) Configuration of the Attack Estimation Unit 200

The attack estimation unit 200 will be described with reference to FIG. 6. The attack estimation unit 200 includes a common log acquisition unit 201, an attack/abnormality relationship table storage unit 202, an estimation unit 203, a matching degree calculation unit 204, and an output unit 205.

The common log acquisition unit 201 acquires a common security log from the common security log generation unit 100.

The attack/abnormality relationship table storage unit 202 is a storage unit that stores the attack/abnormality relationship table. The attack/abnormality relationship table is a relationship table showing a relationship between (c) an attack type, which is a type of attack that the electronic control system is expected to receive, (d) a predicted abnormality information that indicates an abnormality that is predicted to occur in the electronic control system when receiving such an attack, and (e) a predicted abnormality position, which is a position where the predicted abnormality occurs. Since the predicted abnormality position is a common position among the electronic control system S and the other electronic control systems, it is referred to as a common predicted abnormality position.

FIG. 7 is a diagram showing an example of the attack/abnormality relationship table. In the attack/abnormality relationship table shown in FIG. 7, for each type of cyber attack (attacks A to X), the abnormality that occurs when the electronic control system receives the cyber attack and the position where the abnormality occurs are shown either as the first to third layer. As shown in FIG. 7, when a cyber attack is received, it is assumed that multiple abnormalities occur in multiple places/positions. Therefore, it is preferable that the attack/abnormality relationship table shows a combination of multiple abnormalities that occur when an attack is received and their respective positions. FIG. 7 further shows a relationship between (i) the type of cyber attack and (ii) an attack start position of and an attack target position when the cyber attack is received. Note that since both the attack start position and the attack target position are not unique to the configuration of the electronic control system S but are common positions with other electronic control systems, these positions are designated as a common attack start position and a common attack target position.

For example, when a cyber attack whose attack type is attack A is received, it is predicted that an abnormality A, an abnormality C, and an abnormality D will occur in the first layer of the electronic control system. Further, the attack start position of the attack A is a position indicated by an identification number [0000], and the attack target position is a position indicated by an identification number [0x01]. It should be noted that the attack start position is not only a position inside the electronic control system but also a position outside of the electronic control system, in assumption. That the attack start position is outside the electronic control system means that a cyber attack is received from outside the vehicle.

The estimation unit 203 estimates the type of cyber attack received by the electronic control system S by using the attack/abnormality relationship table. Specifically, the estimation unit 203 identifies, from the attack/abnormality relationship table, a combination of (A) the predicted abnormality information and (B) the predicted common abnormality information, i.e., (A) the predicted abnormality information "corresponding to a combination of" (a) the abnormality information and (b) the common abnormality information included in the common security log that is acquired by the common log acquisition unit 201, and (B) the predicted, common abnormality information described above. Nota that, if the combination of the predicted abnormality information and the predicted, common abnormality information which is exactly the same as the combination of the abnormality information and the common abnormality position does not exist in the attack/abnormality relation table, the estimation unit 203 identifies, from among the combinations of the predicted abnormality information and the predicted, common abnormality information included in the attack/abnormality relation table, a closest combination thereof. Then, it is estimated that the attack type indicating the closest combination is the type of cyber attack received by the electronic control system.

Here, "corresponding to a combination" means that a certain combination matches with the subject combination or is similar thereto.

When the common security log includes an order of and a number of occurrences of the abnormality indicated by the abnormality information, the estimation unit 203 may further use such information when estimating the attack type. In such case, the attack/abnormality relationship table includes the order and number of occurrences of the abnormality as the predicted abnormality information.

When there are multiple closest combinations (for example, attack A and attack B), the estimation unit 203 estimates that the type of cyber attack received by the electronic control system is either the attack A or the attack B. Alternatively, the estimation unit 203 may identify that the attack type corresponding to the cyber attack received by the electronic control system does not exist in the attack/abnormality relationship table.

In addition to estimating the type of attack received by the electronic control system, the estimation unit 203 may further estimate the attack start position and the attack target position of an attack. As shown in FIG. 7, since the attack/abnormality relationship table stores the attack type, the attack start position, and the attack target position in association with each other, the estimation unit 203 is enabled to estimate, by using the attack/abnormality relationship table, the attack start position and the attack target position.

The estimation unit 203 may further estimate an abnormality that will occur in the electronic control system S in the future and an attack that will be received in the future, from a difference between (i) the combination of the abnormality information and the common abnormality position and (ii) the combination of the predicted abnormality information and the predicted, common abnormality information. For example, when the number of abnormalities indicated by the abnormality information is smaller than the number of abnormalities indicated by the predicted abnormality information, there is a risk that, among the abnormalities indicated by the predicted abnormality information, abnormalities not included in the abnormalities indicated by the abnormality information will occur in the future. Therefore, the estimation unit 203 estimates that a difference between (i) the abnormality indicated by the predicted abnormality information and (ii) the abnormality indicated by the abnormality information is an abnormality that will occur in the electronic control system in the future. In such a case, the output unit 205, which will be described later, may output future abnormality information indicating the difference between the abnormality indicated by the predicted abnormality information and the abnormality indicated by the abnormality information.

In addition, when the number of abnormalities indicated by the abnormality information is less than the number of abnormalities indicated by the predicted abnormality information, the abnormality indicated by the abnormality information is an abnormality that occurs before receiving a cyber attack, and further abnormalities may occur subject to (i.e., when receiving) a cyber attack in the future. Therefore, the estimation unit 203 estimates that the attack of the estimated attack type is an attack that the electronic control system S may receive in the future. In such a case, the output unit 205, which will be described later, may output future attack information indicating that the attack type included in the attack information is an attack that the electronic control system will receive in the future.

The matching degree calculation unit 204 calculates a matching degree of these combinations when (i) the combination of the abnormality information and the common abnormality position and (ii) the combination of the predicted abnormality information and the predicted, common abnormality information are not exactly the same. The degree of matching is represented by, for example, a numerical value obtained by dividing (i) the difference between the number of abnormalities indicated by the abnormality information and the number of abnormalities indicated by the predicted abnormality information by (ii) the number of abnormalities indicated by the abnormality information or the predicted abnormality information.

The output unit 205 outputs the attack information including the attack type estimated by the estimation unit 203 to the individual attack information generation unit 300, which will be described later. The attack information may further include an attack start position and an attack target position estimated by the estimation unit 203, and a matching degree calculated by the matching degree calculation unit 204.

Further, as described above, when the estimation unit 203 estimates an abnormality that will occur in the electronic control system in the future or an attack that the electronic control system S may receive in the future, the output unit 205 may output the future attack information or the attack information including the future abnormality information.

(4) Configuration of the Individual Attack Information Generation Unit 300

Figure 8:
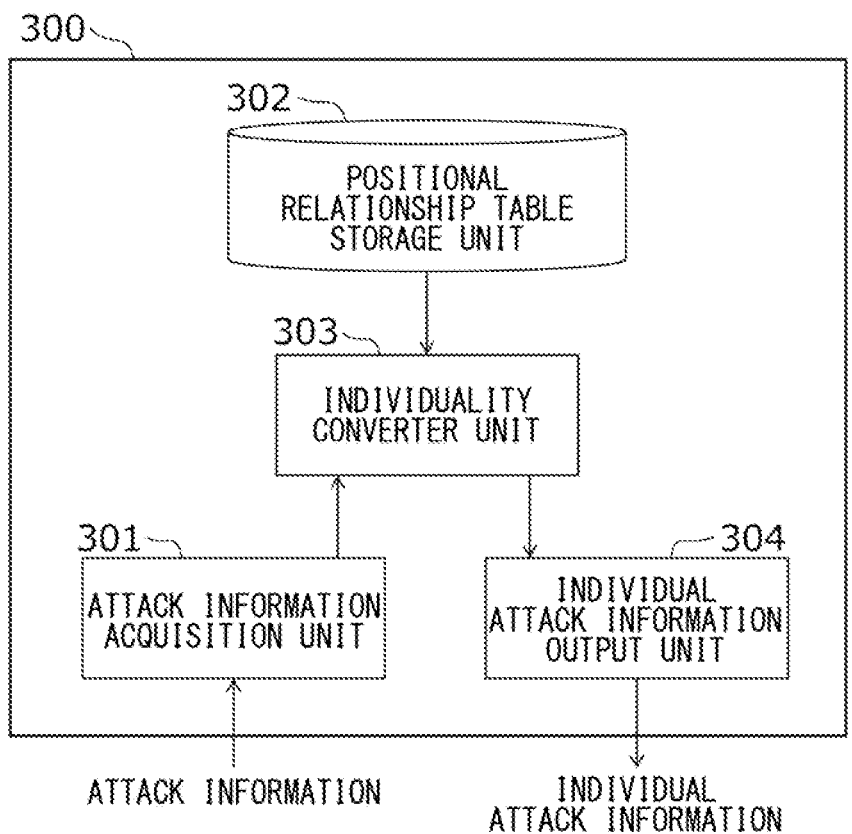
FIG. 8 is a block diagram showing a configuration example of an individual attack information generation unit of the first and second embodiments.

The individual attack information generation unit 300 will be described with reference to FIG. 8. The individual attack information generation unit 300 includes an attack information acquisition unit 301, a positional relationship table storage unit 302, an individuality converter unit 303, and an individual attack information output unit 304.

The attack information acquisition unit 301 acquires the attack information output from the attack estimation unit 200.

The positional relationship table storage unit 302 stores the same positional relationship table as the positional relationship table storage unit 102 of the common security log generation unit 100. Note that, as shown in FIG. 1, in the present embodiment, since the common security log generation unit 100 and the individual attack information generation unit 300 are provided in one attack analyzer 10, the positional relationship table storage unit 102 and the positional relationship table storage unit 302 may be configured as the same storage unit.

The individuality converter unit 303 converts the common attack start position and the common attack target position included in the attack information into the individual position(s) of the electronic control system S by using the positional relationship table. Specifically, the individuality converter unit 303 identifies the common position of the positional relationship table corresponding to the common attack start position, and then identifies the individual position associated with the identified common position as an individual attack start position. Similarly, the individuality converter unit 303 identifies the common position of the positional relationship table corresponding to the common attack target position, and then identifies the individual position associated with the identified common position as an individual attack target position. That is, a position where the common attack start position is converted into the individual position is the individual attack start position, and a position where the common attack target position is converted into the individual position is the individual attack target position.

Note that as shown in the positional relationship table of FIG. 5, multiple individual numbers (i.e., identification numbers: 0x0004, 0x0005) are associated with the third layer (i.e., with an identification number: 0x03). Therefore, when the common attack target position is a position in the third layer, it is not possible to identify whether the individual position is ECU-D or ECU-E. The individuality converter unit 303 may identify the individual positions of all the ECUs included in the first layer as candidates for the individual target positions, but in that case, there is a possibility that the detailed attack target positions cannot be identified. Therefore, the individuality converter unit 303 may convert the common attack start position and the common attack target position to the individual attack start position and the individual attack target position which are respectively the individual position, with reference to the abnormality position included in the individual security log. If the abnormality position included in the individual security log is also included in the common security log output from the common security log generation unit 100 and also in the attack information, the individuality converter unit 303 is included in the attack information. You can refer to the included abnormality position. Alternatively, in the present embodiment, since the common security log generation unit 100 and the individual attack information generation unit 300 are provided in one attack analyzer 10, the attack information generation unit 300 may acquire the abnormality information from the individual security log acquired by the common security log generation unit 100.

The individual attack information output unit 304 outputs the individual attack information including the attack type, the individual attack start position and the individual attack target position converted by the individuality converter unit 303.

(5) Configuration of the Estimation Result Verification Unit 400

Figure 9:
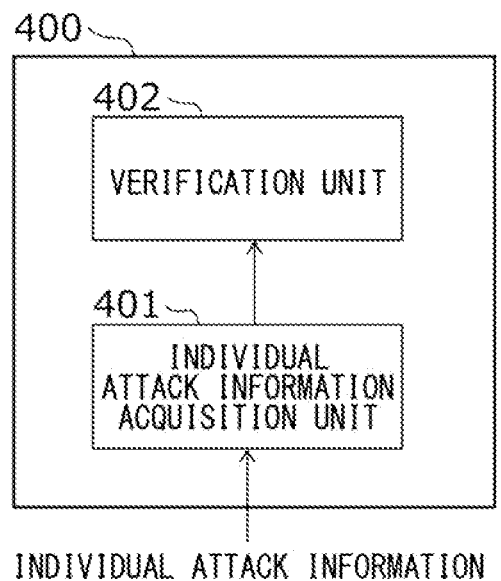
FIG. 9 is a block diagram showing a configuration example of an estimation result verification unit of the first and second embodiments.

The estimation result verification unit 400 will be described with reference to FIG. 9. The estimation result verification unit 400 includes an individual attack information acquisition unit 401 and a verification unit 402.

The individual attack information acquisition unit 401 acquires the individual attack information output from the individual attack information generation unit 300.

The verification unit 402 verifies the contents included in the individual attack information. For example, the verification unit 402 verifies an accuracy or certainty of the estimation result of the attack estimation unit 200 from the matching degree included in the individual attack information. For example, when the matching degree is lower than a predetermined matching degree, the verification unit 402 determines that the estimation result by the attack estimation unit 200 is not correct. Alternatively, the attack estimation unit 200 may be instructed to perform an analysis again together with (i.e., in view of) the estimation results of the past or future individual security logs.

The verification unit 402 may further verify the accuracy or certainty of the attack/abnormality relationship table from the matching degree. For example, when the estimation results with a low degree of matching are continuously occurring, such a situation is determined that (a) an association between the predicted abnormality information included in the attack/abnormality relationship table and the common predicted abnormality position is not accurate, and (b) a reset or an update of the table is required.

The verification unit 402 may verify whether or not the individual attack start position and the individual attack target position included in the individual attack information are correct. For example, the individual security log may include information on an IP address (for example, source and destination of transmission) of the data causing the abnormality, which was received by the ECU before the security sensor detected the abnormality. In such a case, there is a high possibility that the destination position that "indicates" the destination of the data by the IP address is the attack target position, and the source position that "indicates" the source of the data by the IP address is the attack start position. Therefore, when the individual security log contains an IP address, the verification unit 402 verifies whether or not the source position of transmission of the data indicated by the IP address matches the individual attack start position included in the individual attack information. Similarly, the verification unit 402 verifies whether or not the destination position of transmission of the data indicated by the IP address matches the individual attack target position included in the individual attack information. When the individual attack start position and the source of data transmission do not match, the verification unit 402 may update the individual attack start position to the data source position. Similarly, if the individual attack target position and the destination of data transmission do not match, the verification unit 402 may updated the attack target position to the data transmission destination position.

Here, "indicate" is not limited to mean directly indicating the source position or the destination position, but it may also mean information identifying a position, such as an IP address or the like.

(6) Operation of the Attack Analyzer 10

Figure 10:
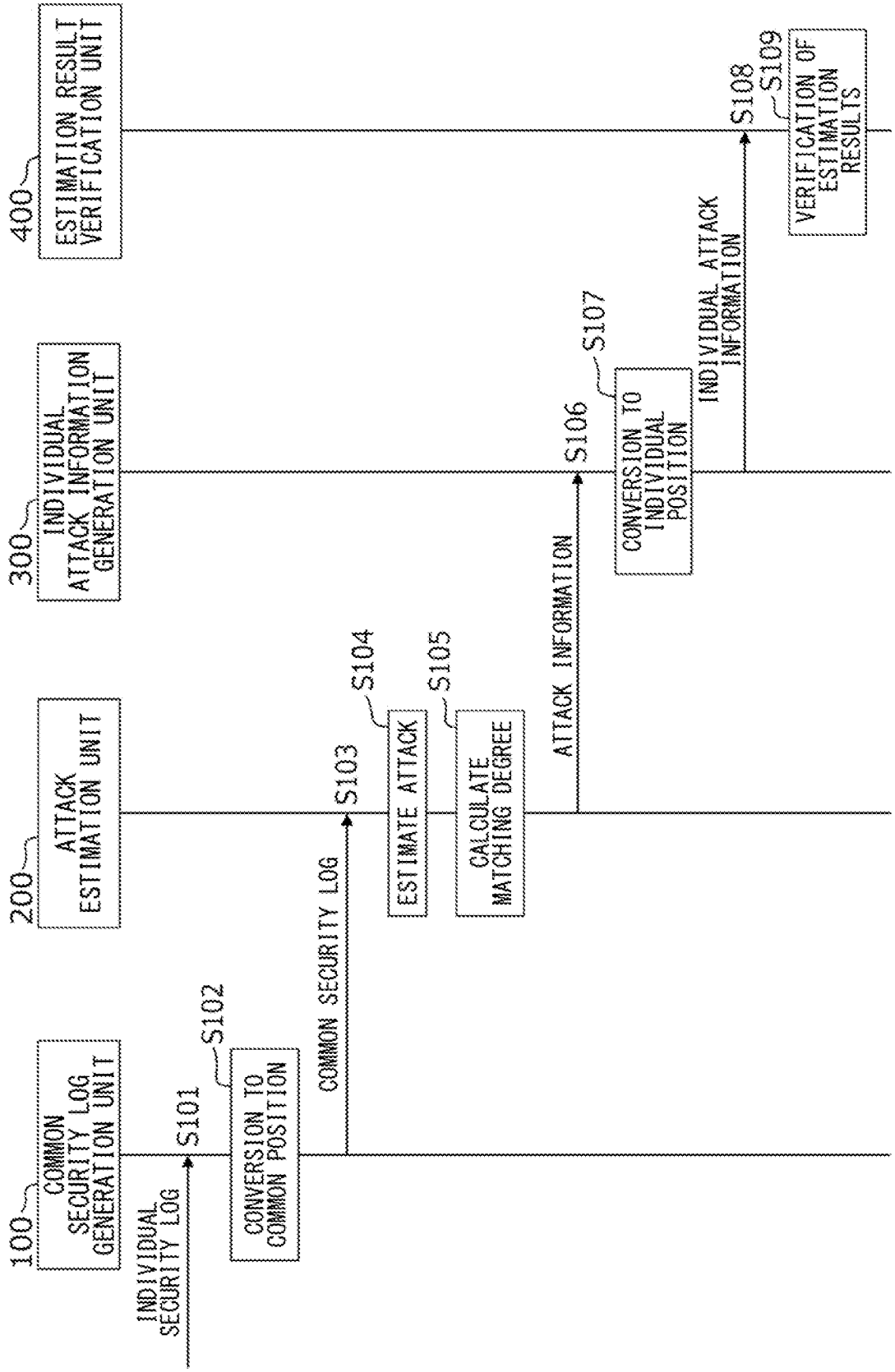
FIG. 10 is a flowchart showing an operation of the attack analysis system of the first and second embodiments.

Next, the operation of the attack analyzer 10 will be described with reference to FIG. 10. The operation of the attack analyzer 10 can also be thought of as the operation of the attack analysis system 1. FIG. 10 not only shows an attack analysis method performed by the attack analyzer 10 and the attack analysis system 1, but also shows a processing procedure of an attack analysis program that can be executed by the attack analyzer 10 and the attack analysis system 1. Further, an order of the processing procedure is not limited to the one shown in FIG. 10. That is, the order may be changed as long as there are no restrictions, such as a relationship in which a result of the preceding step is used in a certain step.

The common security log generation unit 100 acquires an individual security log including abnormality information and an abnormality position from the ECU constituting the electronic control system S (S101). The commonality converter unit 103 of the common security log generation unit 100 converts the abnormality position included in the individual security log into a common abnormality position which is a position common between/among the electronic control system S and other electronic control systems. (S102). The output unit 104 outputs a common security log including the abnormality information and the common abnormality position converted in S102 (S103).

The attack estimation unit 200 estimates, up acquiring the common security log, the type of server attack received by the electronic control system S using the attack/abnormality relationship table (S104). At such timing, the common attack start position and the common attack target position may be estimated together. The matching degree calculation unit 204 of the attack estimation unit 200 calculates the matching degree between the predicted abnormality information and the abnormality information when there is a difference between the predicted abnormality information stored in the attack/abnormality relation table and the abnormality information included in the common security log (S105). Then, the attack information output unit 205 outputs attack information including the estimated attack type, the common attack start position, the common attack target position, and the matching degree (S106).

When the individual attack information generation unit 300 acquires the attack information, the individual attack information generation unit 300 converts the attack start position and the attack target position included in the attack information into the individual attack start position and the individual attack target position which are the individual positions of the electronic control system (S107). Then, the individual attack information including the attack type, the converted individual attack start position and individual attack target position is output (S108).

When the estimation result verification unit 400 acquires the individual attack information, the estimation result verification unit 400 verifies the attack estimation result included in the individual attack information (S109).

(7) Summary

As described above, according to the attack analyzer 10 of the present disclosure, when the electronic control system receives a cyber attack, the individual position, which is a position unique to the electronic control system, is converted into a common position common to other electronic control systems, and then, the type of the cyber attack is estimated. In such manner, even when multiple electronic control systems having different configurations exist, it is possible to apply the attack analysis system of the present disclosure to any of the electronic control systems to analyze the attack.

Further, according to the attack analyzer 10 of the present disclosure, it is not necessary to provide a tool for estimating and analyzing a cyber attack for each of a large number of ECUs constituting the electronic control system, thereby it is easy to manage a device and a program for attack analysis, while reducing a processing load required for attach analysis. Further, the above can be applied even when the number or configuration of ECUs constituting the electronic control system changes in the future.

2. (Second Embodiment)

In the second embodiment, a configuration in which the attack analyzer includes the attack estimation unit 200, and at least a part of the common security log generation unit 100, the individual attack information generation unit 300, and the estimation result verification unit 400 is disposed in a different device from the attack analyzer, is described, with a focus on the differences from the first embodiment. Since the configurations and operations of the common security log generation unit 100, the attack estimation unit 200, the individual attack information generation unit 300, and the estimation result verification unit 400 are the same as those in the first embodiment, the description thereof will be omitted.

Figure 11:
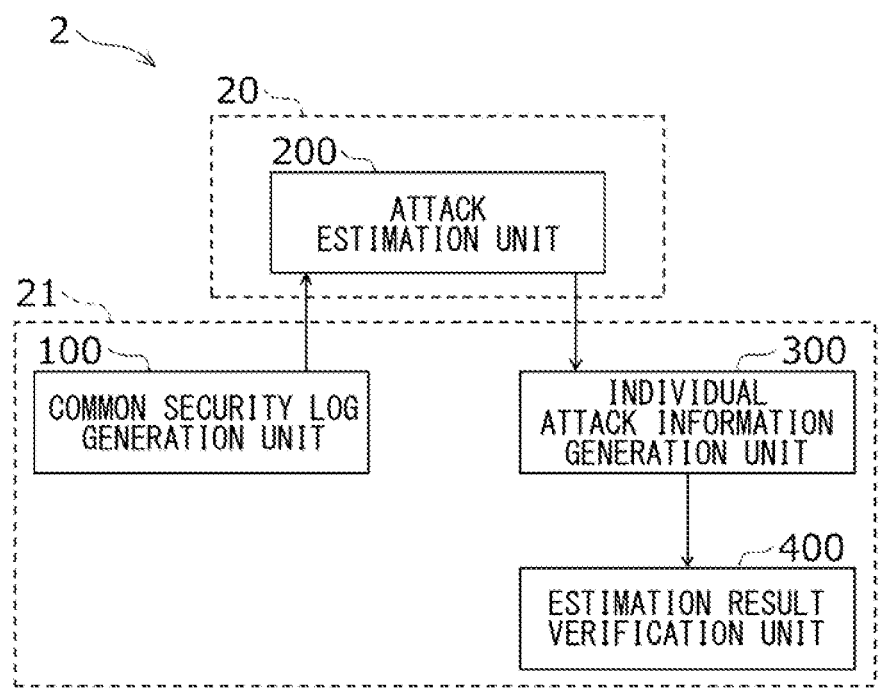
FIG. 11 is a block diagram showing a configuration example of the attack analysis system of the second embodiment.

FIG. 11 is a diagram showing an example of an attack analysis system including an attack analyzer 20 of the present embodiment. In an example of FIG. 11, the attack analyzer 20 includes the attack estimation unit 200 only, and the common security log generation unit 100, the individual attack information generation unit 300, and the estimation result verification unit 400 are provided/disposed in a conversion verification device 21. The attack analyzer 20 and the conversion verification device 21 are combined to form an attack analysis system 2.

Figure 12:
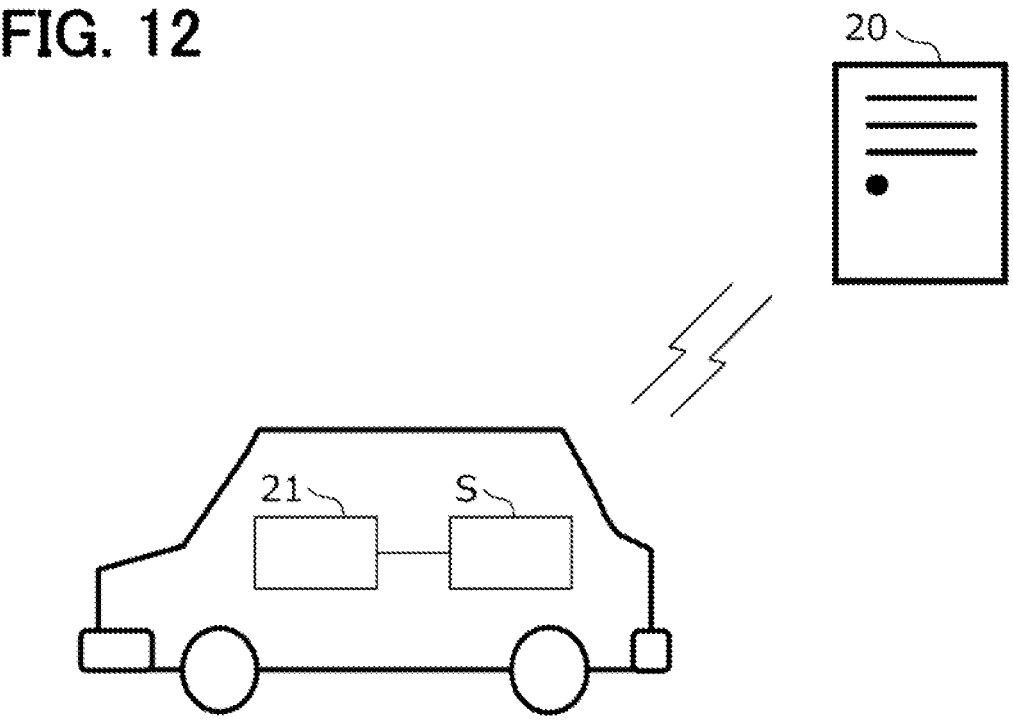
FIG. 12 is an explanatory diagram illustrating the attack analyzer according to the second embodiment.

FIG. 12 is a diagram illustrating the attack analyzer 20 of the present embodiment. As shown in FIG. 12, in the present embodiment, the server device arranged outside the vehicle is the attack analyzer 20, and the vehicle is equipped with the conversion verification device 21.

In the present embodiment, a common security log output from the common security log generation unit 100 is transmitted to the attack estimation unit 200 via a wireless communication network. Similarly, attack information output from the attack estimation unit 200 is transmitted to the individual attack information generation unit 300 via the wireless communication network. Thus, although not shown in FIG. 11, the attack analyzer 20 and the conversion verification device 21 may include a wireless communication unit and an antenna, or either the output unit 104 of the common security log generation unit 100 or the attack information acquisition unit 301 of the individual attack information generation unit 300 may provide a function as a wireless communication unit.

Among the processes executed by the attack analysis system, a process of estimating a server attack received by the electronic control system S, that is, a process of the attack estimation unit 200 has the highest load. Therefore, if the server device includes the attack estimation device 20 having the attack estimation unit 200, the processing load on the vehicle can be significantly reduced.

(1) Modification Example of the Second Embodiment

Figure 13:
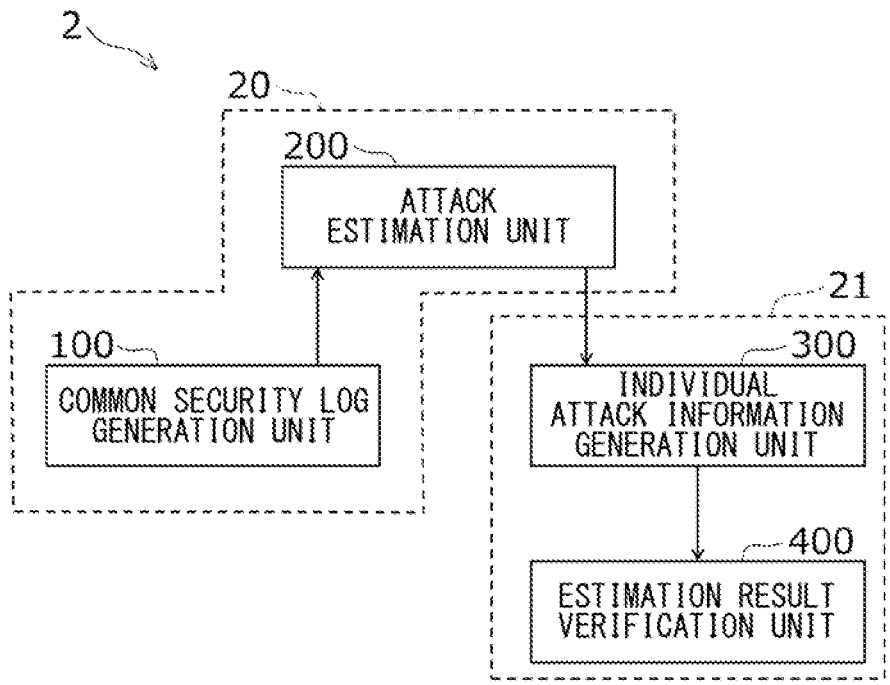
FIG. 13 is an explanatory diagram illustrating the attack analyzer of a modification example of the second embodiment.

FIG. 13 shows a modification example 1 of the second embodiment. In the present modification example, the attack analyzer 20 includes a common security log generation unit 100 in addition to the attack estimation unit 200. In such case, the attack analyzer 20 may be a server device as in the configuration shown in FIG. 12, but the attack analyzer 20 is a device mounted on the vehicle, and the conversion verification device 21 may be realized as a server device. In such case, verification of the attack estimation result by the attack estimation unit 200 is performed on the server device. In the server device, in order to verify the estimation results of cyber attacks in multiple electronic control systems, for example, whether it is necessary to reset or update the attack/abnormality relationship table is determinable based on a comparison of the estimation results of the subject system and with the estimation results of other electronic control systems.

Figure 14:
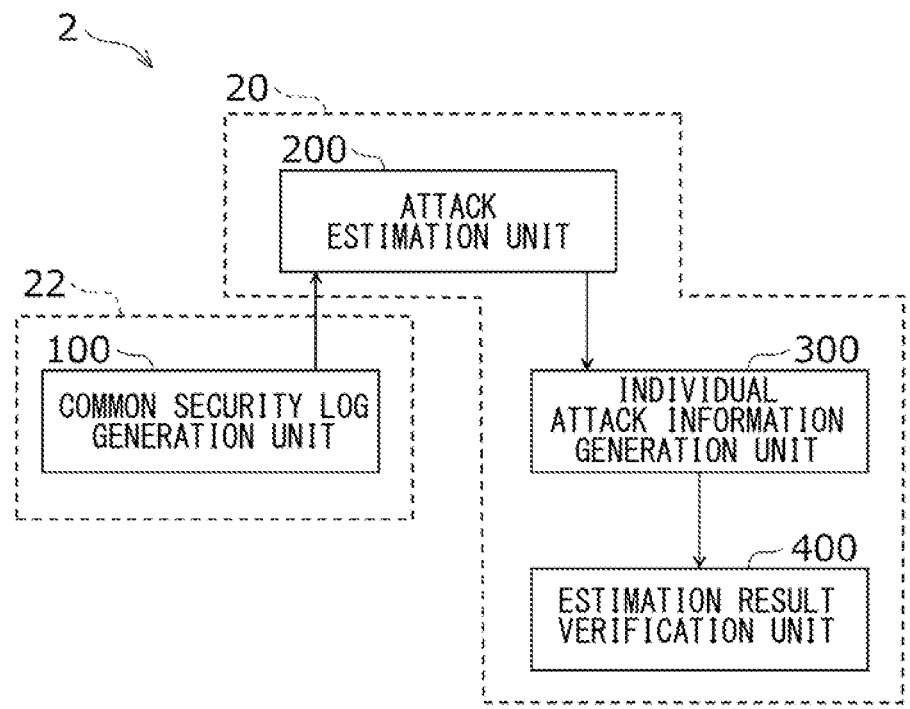
FIG. 14 is an explanatory diagram illustrating the attack analyzer of another modification example of the second embodiment.

Further, FIG. 14 shows a modification example 2 of the second embodiment. In this modification example, the attack analyzer 20 includes an individuality converter unit 300 and an estimation result verification unit 400 in addition to the attack estimation unit 200. Then, the common security log generation unit 100 is provided in a conversion device 22. In this modification example, the attack analyzer 20 having the attack estimation unit 200 and the estimation result verification unit 400 respectively having a heavy processing load may preferably be a server device, but is not limited to such a configuration.

3. (Recapitulation)

The features of the attack analyzer and the like in each of the embodiments of the present disclosure have been described above.

Since the terms used in each embodiment are examples, the terms may be replaced with terms that are synonymous or include synonymous functions.

The block diagram used for the description of the embodiment is obtained by classifying and arranging the configurations of the device for each of the functions. Individual function blocks may be implemented by arbitrarily combining hardware and software. Further, since the block diagram illustrates functions, the block diagram can be understood as disclosure of a method and a program that implements the method.

Function blocks that can be understood as processes, flows, and methods described in the respective embodiments may be changed in order as long as there is no restrictions such as a relationship in which results of preceding other steps are used in one step.

The terms such as first, second, to N-th (where N is an integer) used in each of the embodiments and in the claims are used to distinguish two or more configurations and methods of the same kind and are not intended to limit the order or superiority.

Each of the embodiments is provided based on an assumption of providing a vehicle attack analyzer for analyzing a server attack on an electronic control system mounted on a vehicle, but the present disclosure encompasses, unless otherwise limited within the scope of the claims, other dedicated or general-purpose devices.

Further, as an example form of the attack analyzer of the present disclosure, the following can be mentioned. Examples of a form of a component include a semiconductor device, an electronic circuit, a module, and a microcomputer. Examples of a form of a semi-finished product include an electronic control device (i.e., electronic control unit or ECU) and a system board. Examples of a form of a finished product include a cellular phone, a smartphone, a tablet computer, a personal computer (PC), a workstation, and a server. The example forms may further include a device having a communication function and the like, such as for example, a video camera, a still camera, and a car navigation system, for example.

In addition, necessary functions such as an antenna and a communication interface may be added to the attack analyzer.

It is assumed that the attack analyzer of the present disclosure is used for the purpose of providing various services, especially by being used on the server side. For providing such services, the attack analyzer of the present disclosure will be used, the method of the present disclosure will be used, and/or the program of the present disclosure will be executed.

Further, the present disclosure is implemented not only by dedicated hardware having a configuration and a function described in relation to each of the embodiments, but by a combination of (i) a program for implementing the present disclosure, which is recorded on such a recording medium as memory, a hard disk and the like, and (ii) general-purpose hardware including dedicated or general-purpose CPU, memory, or the like, capable of executing the program.

A program stored in a non-transitory, tangible storage medium (for example, an external storage device (a hard disk, a USB memory, a CD/BD, or the like) of dedicated or general-purpose hardware, or stored in an internal storage device (a RAM, a ROM, or the like)) may be provided to dedicated or general-purpose hardware via a recording medium, or from a server via a communication line without using the recording medium. In such manner, it is possible to always provide a latest function by updating the program.

INDUSTRIAL APPLICABILITY

The attack analyzer of the present disclosure is mainly intended for or targeting a device that analyzes a cyber attack received by an electronic control system mounted on an automobile, but may also be intended for or targeting a device that analyzes an attack on a normal system that is not mounted on an automobile.

What is claimed is:

1. An attack analyzer comprising a processor coupled to a memory configured to execute:
    a common log acquisition unit acquiring a common security log from a common security log generation unit, the common security log including:
        (a) abnormality information indicating an abnormality detected by an electronic control system, and
        (b) a common abnormality position indicating an abnormality position of the abnormality converted to be common among the electronic control system and other electronic control systems;
    an attack/abnormality relationship table storage unit storing an attack/abnormality relationship table indicating a relationship among:
        (c) an attack type of an attack on the electronic control system,
        (d) predicted abnormality information indicating a predicted abnormality predicted to occur when the electronic control system is attacked, and
        (e) a common predicted abnormality position indicating a predicted abnormality position of the predicted abnormality converted to be common among the electronic control system and the other electronic control systems;
    an estimation unit estimating the attack type of the attack received by the electronic control system from a combination of (A) the predicted abnormality information corresponding to a combination of (a) the abnormality information and (b) the common abnormality position, and (B) the common predicted abnormality position; and
    an output unit outputting attack information including the attack type, wherein
    the common security log generation unit includes
        an individual log acquisition unit acquiring an individual security log including the abnormality information and the abnormality position,
        a positional relationship table storage unit storing a positional relationship table, which shows a relationship between (a) an individual position, which is a position in the electronic control system, and (b) a common position, which is a position of the individual position converted to be common between the electronic control system and the other electronic control systems, and
        a commonality converter unit converting the abnormality position to the common abnormality position using the positional relationship table.

2. The attack analyzer of claim 1, wherein
    the common abnormality position is a position converted to be common according to, from among divided-by-security-level multiple layers of the electronic control system, a layer to which the abnormality position belongs.

3. The attack analyzer of claim 2, wherein
    the abnormality position is a position of the electronic control device constituting the electronic control system, and
    the common abnormality position is a position converted to be common according to a network to which the electronic control device is connected in addition to the layer to which the abnormality position belongs.

4. The attack analyzer of claim 2, wherein
    the abnormality position is a position of the electronic control device constituting the electronic control system, and
    the common abnormality position is a position converted to be common according to a function of the electronic control device in addition to the layer to which the abnormality position belongs.

5. The attack analyzer of claim 1, wherein
    the attack/abnormality relationship table further indicates a relationship among (i) the attack type, and (ii) a common attack start position as well as a common attack target position, the common attack start position being an attack start position and the common attack target position being an attack target position respectively converted to be common among the electronic control system and the other electronic control system, and
    the attack information further includes the common attack start position and the common attack target position.

6. The attack analyzer of claim 1, wherein
    the estimation unit estimates, as an attack type of the attack on the electronic control system, the attack type corresponding to a combination of (i) the predicted abnormality information and (ii) the common predicted abnormality position, the predicted abnormality information being closest to a combination of (a) the abnormality information and (b) the common abnormality position.

7. The attack analyzer of claim 6 further comprising:
    a matching degree calculation unit calculating a matching degree between (A) the combination of the abnormality information and the common abnormality position and (B) the combination of the predicted abnormality information and the common prediction abnormality position, wherein
    the attack information further includes the matching degree.

8. The attack analyzer of claim 1, wherein
    the estimation unit estimates that a difference between the abnormality indicated by the abnormality information and the abnormality indicated by the predicted abnormality information is an abnormality that will occur in the electronic control system in future, and
    the attack information further includes future abnormality information indicating the difference.

9. The attack analyzer of claim 1, wherein
the electronic control system is an electronic control system mounted on a mobile body having a common security log generation unit that generates a common security log,
the attack analyzer is a server device arranged outside the movable body, and
the common log acquisition unit acquires the common security log generated by the common security log generation unit.

10. The attack analyzer of claim 1, wherein
the common security log generation unit generates the common security log.

11. The attack analyzer of claim 10, wherein
the electronic control system is an electronic control system mounted on a movable body,
the attack analyzer is a server device arranged outside of the movable body,
the common log acquisition unit acquires identification information that identifies the electronic control system, in addition to the common security log, and
the commonality converter unit identifies the positional relationship table to be used based on the identification information.

12. The attack analyzer of claim 1, wherein
the attack/abnormality relationship table further indicates a relationship among (i) the attack type, and (ii) a common attack start position as well as a common attack target position, the common attack start position being an attack start position and the common attack target position being an attack target position respectively converted to be common among the electronic control system and the other electronic control systems,
the attack information further includes the common attack start position and the common attack target position,
the attack analyzer further includes an individual attack information generation unit,
the individual attack information generation unit includes:
a positional relationship table storage unit that stores the positional relationship table showing a relationship between (i) the common position which is a position converted to be common among the electronic control system and the other electronic control systems and (ii) the individual position which is individualized from the common position to a position in the electronic control system; and
an individuality converter unit that converts, by using the positional relationship table, the common attack start position to an individual attack start position which is a position in the electronic control system, and also converts the common attack target position to an individual attack target position which is a position in the electronic control system.

13. The attack analyzer of claim 12, wherein
the common security log further includes a source position indicating a transmission source of data causing the abnormality,
the attack analyzer further includes:
an estimation result verification unit having a verification unit that verifies whether or not the individual attack start position and the source position match, and, when the individual attack start position and the source position do not match, updates the individual attack start position to the source position.

14. The attack analyzer of claim 12, wherein
the common security log further includes a destination position indicating a transmission destination of data causing the abnormality,
the attack analyzer further includes:
an estimation result verification unit having a verification unit that verifies whether or not the individual attack target position and the destination position match, and, when the individual attack target position and the destination position do not match, updates the individual attack target position to the destination position.

15. The attack analyzer of claim 1, wherein
a vehicle type of the electronic control system and a vehicle type of the other electronic control systems are different from each other.

16. An attack analysis method performed by an attack analyzer analyzing an attack on an electronic control system, the attack analyzer provided with an attack/abnormality relationship table storage unit storing an attack/abnormality relationship table indicating a relationship among (c) an attack type of an attack received by the electronic control system, (d) predicted abnormality information indicating a predicted abnormality predicted to occur when the electronic control system receives the attack, and (e) a common predicted abnormality position indicating a predicted abnormality position of the predicted abnormality converted to be common among the electronic control system and the other electronic control system, the attack analysis method comprising:
acquiring a common security log from a common security log generation unit, the common security log including
  (i) abnormality information indicating an abnormality detected by the electronic control system, and
  (ii) a common abnormality position which is an abnormality position of the abnormality converted to be common among the electronic control system and other electronic control system;
estimating the attack type of the attack received by the electronic control system from a combination of
  (A) (d) the predicted abnormality information corresponding to a combination of (a) the abnormality information and (b) the common abnormality position, and
  (B) (e) the common predicted abnormality position, and
outputting attack information including the attack type, wherein
the common security log generation unit includes
  an individual log acquisition unit acquiring an individual security log including the abnormality information and the abnormality position,
  a positional relationship table storage unit storing a positional relationship table, which shows a relationship between (a) an individual position, which is a position in the electronic control system, and (b) a common position, which is a position of the individual position converted to be common between the electronic control system and an other electronic control system, and
  a commonality converter unit converting the abnormality position to the common abnormality position using the positional relationship table.

17. A non-transitory computer-readable storage medium including instructions that, when executed by a processor, control a computer to serve as an attack analyzer analyzing an attack on an electronic control system, the attack analyzer including: an attack/abnormality relationship table storage unit storing an attack/abnormality relationship table indicating a relationship among (c) an attack type of an attack received by the electronic control system, (d) predicted abnormality information indicating a predicted abnormality predicted to occur when the electronic control system receives the attack, and (e) a common predicted abnormality position indicating a predicted abnormality position of the predicted abnormality converted to be common among the electronic control system and the other electronic control system, the instructions comprising:

acquiring a common security log from a common security log generation unit, the common security log including
        (i) abnormality information indicating an abnormality detected by the electronic control system, and
        (ii) a common abnormality position which is an abnormality position of the abnormality converted to be common among the electronic control system and other electronic control system;
    estimating the attack type of the attack received by the electronic control system from a combination of
        (A) (d) the predicted abnormality information corresponding to a combination of (a) the abnormality information and (b) the common abnormality position, and
        (B) (e) the common predicted abnormality position, and
    outputting attack information including the attack type, wherein
    the common security log generation unit includes
        an individual log acquisition unit acquiring an individual security log including the abnormality information and the abnormality position,
        a positional relationship table storage unit storing a positional relationship table, which shows a relationship between (a) an individual position, which is a position in the electronic control system, and (b) a common position, which is a position of the individual position converted to be common between the electronic control system and an other electronic control system, and
        a commonality converter unit converting the abnormality position to the common abnormality position using the positional relationship table.

18. An attack analysis method performed by an attack analyzer analyzing an attack on an electronic control system, the attack analyzer including: an attack/abnormality relationship table storage unit storing an attack/abnormality relationship table indicating a relationship among (c) an attack type of an attack received by the electronic control system, (d) predicted abnormality information indicating a predicted abnormality predicted to occur when the electronic control system receives the attack, and (e) a common predicted abnormality position indicating a predicted abnormality position of the predicted abnormality converted to be common among the electronic control system and the other electronic control system, the attack analysis method comprising:

acquiring abnormality information of the attack detected by the electronic control system and an abnormality position where the abnormality has occurred;
    converting the abnormality position to a common abnormality position by using a positional relationship table showing a relationship between an individual position, which is a position in the electronic control system, and a common position, which is a position where the individual position converted to be common among the electronic control system and the other electronic control system,
    acquiring a common security log including the abnormality information and the common abnormality position,
    estimating the attack type of the attack received by the electronic control system from a combination of
        (A) (d) the predicted abnormality information corresponding to a combination of (a) the abnormality information and (b) the common abnormality position, and
        (B) (e) the common predicted abnormality position, and
    outputting the attack information including the attack type, the common attack start position, and the common attack target position, and
    converting the common attack target position to an individual attack target position which is a position in the electronic control system, and converting the common attack start position to an individual attack start position which is a position in the electronic control system.

\* \* \* \* \*